(12) United States Patent
Chen (10) Patent No.: US 6,662,663 B2
(45) Date of Patent: Dec. 16, 2003

(54) PRESSURE SENSOR WITH TWO MEMBRANES FORMING A CAPACITOR

(75) Inventor: Chien-Hua Chen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/120,944

(22) Filed: Apr. 10, 2002

(65) Prior Publication Data

US 2003/0192383 A1 Oct. 16, 2003

(51) Int. Cl.[7] .................................................. G01L 9/12
(52) U.S. Cl. ............................. 73/718; 73/700; 73/724; 361/280; 324/658
(58) Field of Search ........................ 73/718, 715, 724, 73/194, 726, 727, 730; 219/522, 203, 543; 318/483, 587, 130; 361/283, 284, 706

(56) References Cited

U.S. PATENT DOCUMENTS

| | | | |
|---|---|---|---|
| 4,445,383 A | 5/1984 | Binder et al. | |
| 4,589,054 A | 5/1986 | Kuisma | |
| 4,594,639 A | 6/1986 | Kuisma | |
| 4,612,599 A | 9/1986 | Ziegler | |
| 4,628,403 A | 12/1986 | Kuisma | |
| 4,943,032 A | 7/1990 | Zdeblick | |
| 5,197,330 A | 3/1993 | Onodera | |
| 5,242,863 A | 9/1993 | Xiang-Zheng et al. | |
| 5,264,075 A * | 11/1993 | Zanini-Fisher et al. | 438/53 |
| 5,295,247 A * | 3/1994 | Chang et al. | 710/305 |
| 5,381,299 A * | 1/1995 | Provenzano et al. | 361/283.4 |
| 5,578,843 A | 11/1996 | Garabedian et al. | |
| 5,833,603 A | 11/1998 | Kovacs et al. | |
| 6,388,299 B1 * | 5/2002 | Kang et al. | 257/415 |
| 2001/0009112 A1 | 7/2001 | Delaye | |

* cited by examiner

Primary Examiner—Edward Lefkowitz
Assistant Examiner—Alandra Ellington (57) ABSTRACT

A pressure sensor may include a first membrane that flexes in response to pressure, a reference cavity covered by the first membrane where the reference cavity contains a vacuum and a second membrane, adjacent to the first membrane, the first and second membranes forming a capacitor having a capacitance that varies in accordance with the flexing of the first membrane and the pressure.

4 Claims, 10 Drawing Sheets

PRESSURE SENSOR WITH TWO MEMBRANES FORMING A CAPACITOR

FIELD OF THE INVENTION

The present invention relates to the field of pressure sensors and the field of fabricating pressure sensors. The present invention also relates to the field of integrating pressure sensors with other devices and systems.

BACKGROUND OF THE INVENTION

Conventional pressure-sensors are used in a wide variety of applications to monitor or control pressure in devices or systems where maintaining a particular pressure is important. However, conventional pressure sensors are relatively large.

Consequently, conventional pressure sensors are not easily integrated with other devices. The conventional pressure sensor has a minimum footprint that makes such sensors difficult to incorporate in, for example, microelectronic devices. Moreover, conventional pressure sensors are difficult to integrate with microelectromechanical systems (MEMS), i.e., mechanical structures including moving parts with microelectronics.

SUMMARY OF THE INVENTION

According to one embodiment of the present invention, a pressure sensor may include a first membrane that flexes in response to pressure, a reference cavity covered by the first membrane where the reference cavity contains a vacuum and a second membrane, adjacent to the first membrane and not within the reference cavity, the first and second membranes forming a capacitor having a capacitance that varies in accordance with the flexing of the first membrane and the pressure.

BRIEF DESCRIPTION OF THE DRAWINGS

The accompanying drawings illustrate embodiments of the present invention and are a part of the specification. Together with the following description, the drawings demonstrate and explain the principles of the present invention. The illustrated embodiments are examples of the present invention and do not limit the scope of the invention.

FIG. 1b is a top-down view of the pressure sensor shown in FIG. 1a.

FIGS. 5a–8b illustrate the pressure sensor integrated with an ARS device, as shown in FIG. 4, at various stages in a manufacturing process.

Throughout the drawings, identical reference numbers designate similar, though not necessarily identical, elements.

DETAILED DESCRIPTION OF THE INVENTION

In one embodiment, the present invention may be a pressure sensor having a first membrane that flexes in response to pressure, a reference cavity covered by the first membrane, the reference cavity containing a vacuum and a second membrane adjacent to the first membrane, the first and second membranes forming a capacitor having a capacitance that varies in accordance with the flexing of the first membrane and the pressure.

In another embodiment, the present invention may be a pressure system having a pressure regulator for regulating pressure in a pressurized environment, and a pressure sensor disposed in or in communication with the pressurized environment so as to output an indication of the pressure in the pressurized environment, where the pressure regulator is configured to operate in response to the output from the pressure sensor. The pressure sensor is that described above according to principles of the present invention having a first membrane that flexes in response to pressure, a reference cavity covered by the first membrane, the reference cavity containing a vacuum and a second membrane adjacent to the first membrane, the first and second membranes forming a capacitor having a capacitance that varies in accordance with the flexing of the first membrane and the pressure.

In another embodiment, the present invention may be a pressure sensor integrated with a microelectromechanical system (MEMS). This integrated device preferably includes a silicon substrate, a MEMS formed on or in the substrate, and a pressure sensor formed in the substrate. The pressure sensor is that described above according to principles of the present invention having a first membrane that flexes in response to pressure, a reference cavity covered by the first membrane, the reference cavity containing a vacuum and a second membrane adjacent to the first membrane, the first and second membranes forming a capacitor having a capacitance that varies in accordance with the flexing of the first membrane and the pressure.

In another embodiment, the present invention may be a pressure sensor integrated with an atomic resolution storage (ARS) device. This integrated device preferably includes a first substrate, an ARS device formed in the first substrate, and a pressure sensor formed in the first substrate. The pressure sensor is that described above according to principles of the present invention having a first membrane that flexes in response to pressure, a reference cavity covered by the first membrane, the reference cavity containing a vacuum and a second membrane adjacent to the first membrane, the first and second membranes forming a capacitor having a capacitance that varies in accordance with the flexing of the first membrane and the pressure.

The present invention also encompasses a method of fabricating a pressure sensor by etching a silicon substrate to form a reference cavity, a first membrane and a second membrane. More specifically, a method according to principles of the present invention may be a method of fabricating a pressure sensor by bonding a first substrate to a second substrate, the second substrate comprising electrical connections, etching the first substrate to form a first membrane, a second membrane adjacent and spaced from the first membrane and a reference cavity bounded by the first membrane, wherein the first and second membranes are placed in electrical connection with the connections on the second substrate and bonding a third substrate to the first substrate to seal a vacuum in the reference cavity.

Finally, in another embodiment, the present invention may be a method of integrally fabricating a pressure sensor and an atomic resolution storage (ARS) device by bonding a first substrate to a second substrate, the second substrate having electrical connections, etching the first substrate to form a first membrane, a second membrane adjacent and spaced from the first membrane, a reference cavity bounded by the first membrane, and a flexture of the ARS device, wherein the first and second membranes are placed in electrical connection with the connections on the second substrate, and bonding a third substrate to the first substrate to seal a vacuum in the reference cavity and the ARS device, and providing an emitter cavity for the ARS device.

Figure 1A:
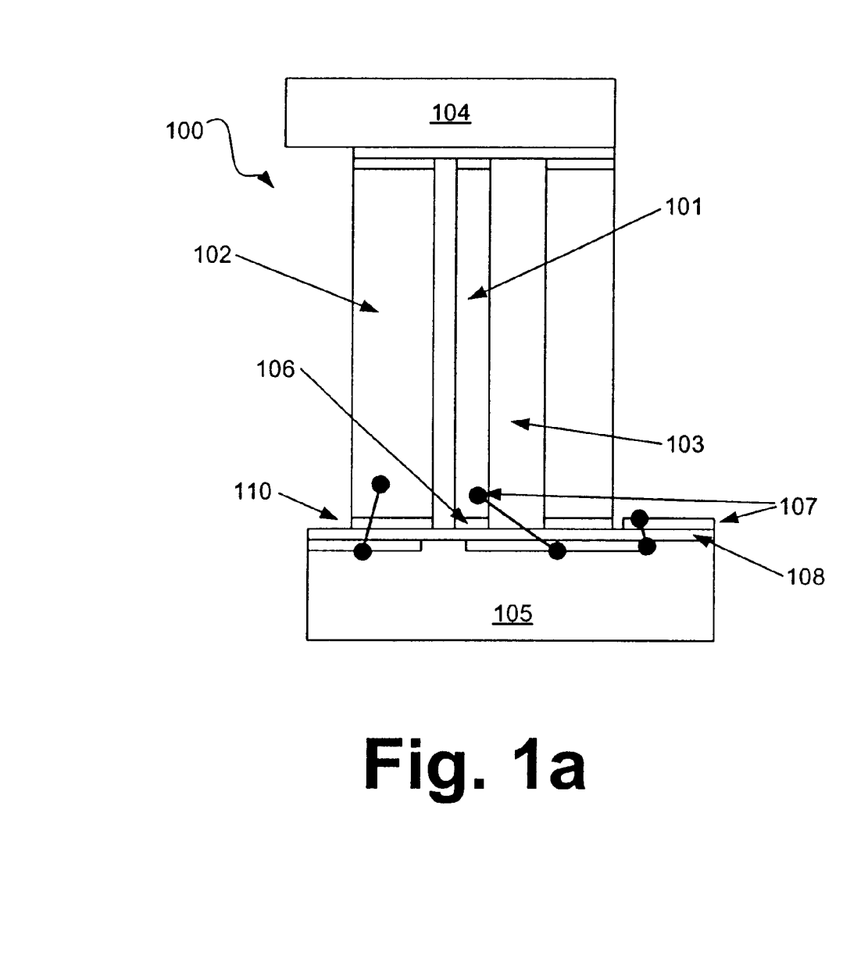
FIG. 1a is a cross-sectional view of a pressure sensor according to one embodiment of the present invention.

The present invention provides, among other things, an improved pressure sensor that is more easily integrated into microscopic and microelectronic devices. FIG. 1a is a cross-sectional view of a pressure sensor according to one embodiment of the present invention.

As shown in FIG. 1a, a pressure sensor (100), according to principles of the present invention, includes a thin silicon membrane (101). The thickness of the membrane (101) is such that the membrane (101) is responsive to, and will flex in proportion with, a pressure (110) applied to the sensor (100). Behind the thin membrane (101) is a reference cavity (103). The sealed reference cavity (103) contains a vacuum.

A second silicon membrane (102), which is preferably thicker and less flexible that the thin membrane (101), is formed adjacent to the thin membrane (101) outside the reference cavity (103). The two membranes (101, 102) and the walls defining the reference cavity (103) are supported between an upper substrate (104) and a lower substrate (105). A bonding layer (106) secures the membranes (101, 102) between the upper (104) and lower (105) substrates.

Figure 1B:
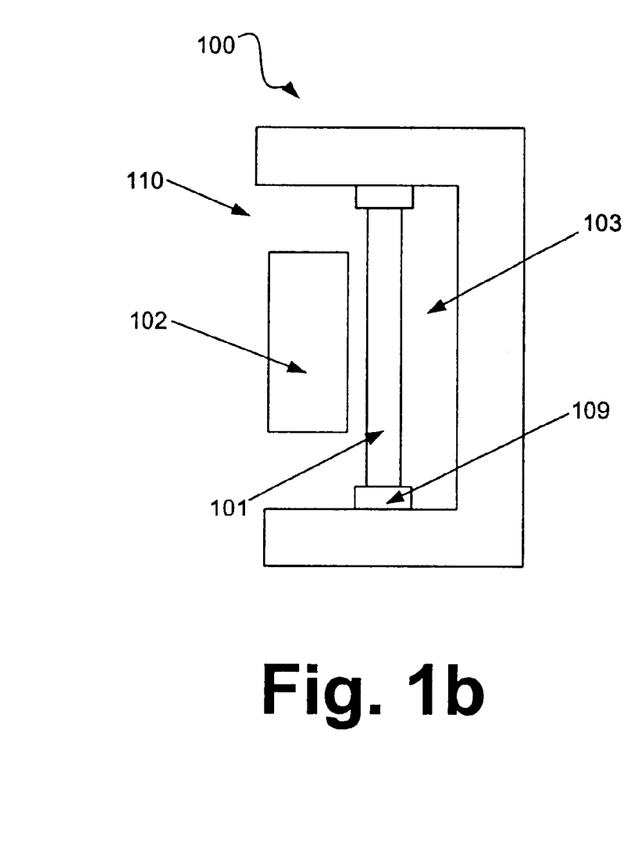

FIG. 1b provides a top view of the pressure sensor (100). As shown in FIG. 1b, the thin membrane (101) is secured along its lateral sides with a polysilicon anchor (109). The polysilicon anchor (109) secures each lateral side of the thin membrane (101) to the walls that define the reference cavity (103).

Returning to FIG. 1a, a dielectric layer (108) is disposed between the boding layer (106) and the upper (104) and lower (105) substrates. Beneath the dielectric layer, either of the substrates may be patterned with electric interconnections (107). In the embodiment of FIG. 1a, the connections (107) are provided on the lower substrate (105). The connections (107) as shown in FIG. 1a, penetrate the dielectric (108) and bonding (106) layers to make contact with each of the two membranes (101, 102).

Together, the thin membrane (101) and the second membrane (102) form a capacitor with a specific capacitance that can be measured through, for example, the electrical connections (107). As various amounts of pressure (110) are applied to the sensor (100), the thin membrane (101) will flex in proportion to the amount of pressure applied.

As the thin membrane (101) flexes, the space between the thin membrane (101) and the second membrane (102) will vary. The variation in the space between the thin membrane (101) and the second membrane (102) will correspond to the amount of pressure (110) applied to the sensor (100). The variation in the space between the thin membrane (101) and the second membrane (102) will also vary the capacitance of the capacitor formed by the two membranes (101, 102). This variance in capacitance is given by the following formula:

$$\Delta C = C_o - \int_x \int_y \frac{\varepsilon}{d_o - d(X, Y)} dx\, dy$$

The change in capacitance $\Delta C$ will be directly related to the amount of pressure (101) applied to the sensor (100). Consequently, an indication of the pressure (110) applied can be output by the circuit, including connections (107), that monitors the capacitance between the thin membrane (101) and the second membrane (102). A numeric reading of the pressure can be calculated from the change in capacitance if desired.

Alternatively, the thin membrane (101) will have a piezo-resistivity that will vary with the deflection of the membrane (101) under pressure. Consequently, an indication of the pressure applied to the membrane can also be obtained by measuring the piezo-resistivity of the membrane (101). From this piezo-resistivity measurement, the pressure applied can be calculated.

Figure 2:
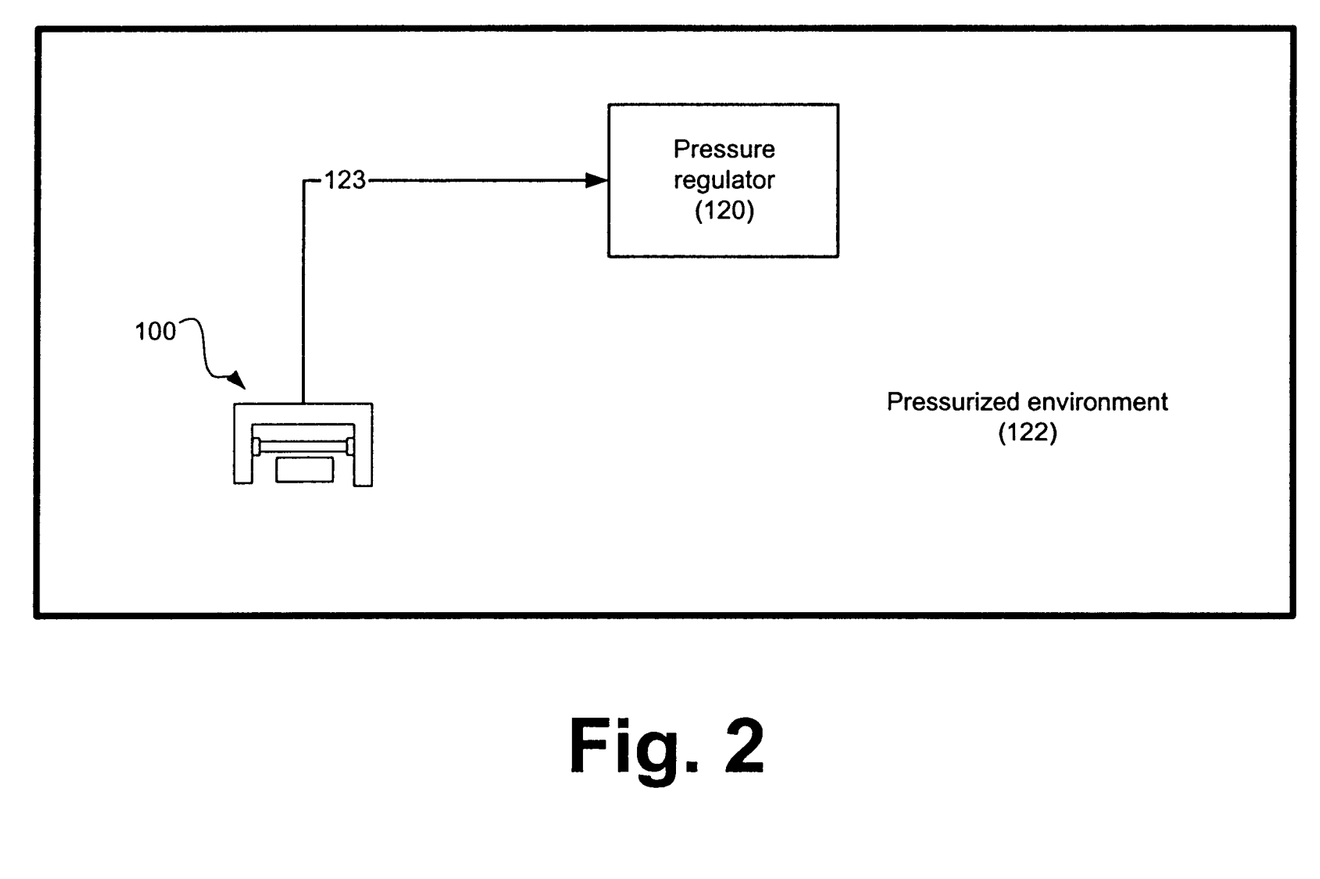
FIG. 2 is a block diagram illustrating another embodiment of the present invention in which the pressure sensor of FIG. 1 is used in a pressure control circuit.

FIG. 2 is a block diagram illustrating another embodiment of the present invention in which the pressure sensor of FIG. 1 is used in a pressure control circuit. As shown in FIG. 2, a pressurized environment (122) is created in which it is important to maintain a particular pressure or to maintain the pressure within a specified range.

A pressure regulator (120) is provided for altering the pressure in the pressurized environment (122). The pressure regulator (120) can be any device or means that alters the pressure in the environment (122). For example, the pressure regulator (120) may be a vacuum pump, a compressor, a getter, etc.

A pressure sensor (100), according to principles of the present invention, is preferably disposed within or in communication with the pressurized environment (122). Consequently, the pressure sensor (100) will output an indication (123) of the pressure applied thereto, i.e., the pressure in the pressurized environment (122).

This output (123), as shown in FIG. 2, is preferably provided to the pressure regulator (120). The pressure regulator (120) responds to the input from the pressure sensor (100). For example, if the pressure sensor (100) indicates that the pressure in the pressurized environment is at an optimal level or within an optimal range, the pressure regulator (120) will deactivate or take no action.

However, if the pressure sensor (100) indicates that the pressure in the environment (122) is above or below an optimal level or range, the pressure regulator (120) will respond appropriately to return the pressure in the environment (122) to the optimal level or to within the optimal range. When a desired pressure is restored within the environment (122), the pressure sensor (100) will so signal to the pressure regulator (120). The regulator (120) then again deactivates or takes no further action, allowing the pressure to remain at the desired level or within the desired range.

Figure 3:
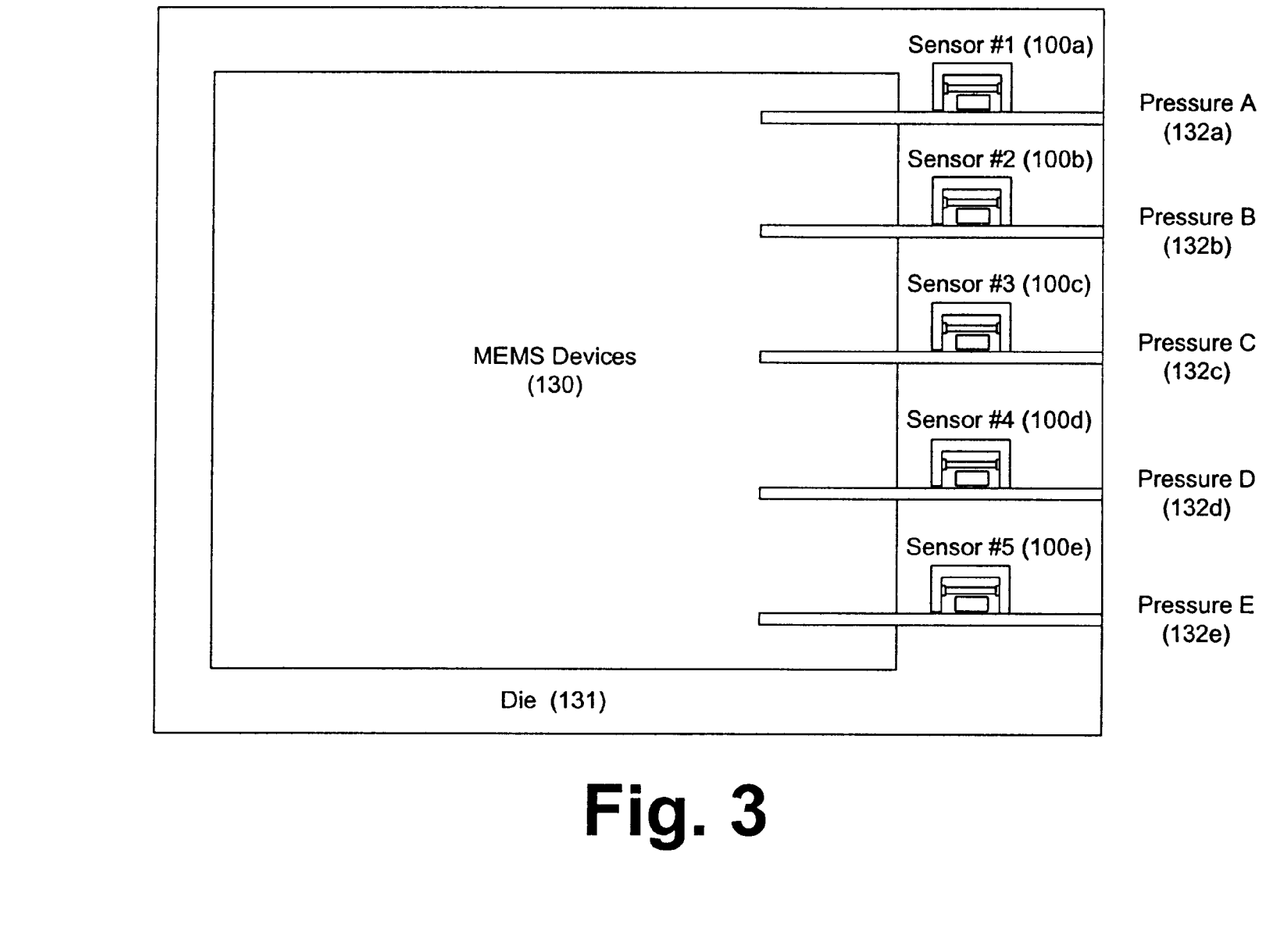
FIG. 3 is an illustration of another embodiment of the present invention in which the pressure sensor of FIG. 1 is integrated with a MEMS device.

FIG. 3 is an illustration of another embodiment of the present invention in which the pressure sensor of FIG. 1 is integrated with a micro-electromechanical system (MEMS). A MEMS is a system that combines mechanical structures (moving parts) with microelectronics. Frequently, a MEMS (130) is formed on a semiconductor wafer or die (131).

As shown in FIG. 3., a MEMS (130), or a number of MEMS (130) formed on a single die (131), may require an input, such as air, a gas or liquid, that is under pressure. Consequently, FIG. 3 illustrates a MEMS (130) that uses five different pressurized inputs (132a–132e).

As will be readily appreciated, it may be necessary to monitor the pressure of each of these inputs (132a–132e). A minimum pressure may be required for proper operation of the MEMS (130). Alternatively, too high a pressure may damage the MEMS (130).

Consequently, as shown in FIG. 3, a pressure sensor (100a–100e), according to principles of the present invention, may be used at each of the pressurized inputs (132a–132e) to monitor the pressure of the input. The output from the pressure sensors (100) can then be used by pressure regulators to control the pressure of the pressurized inputs (132a–132e).

Figure 4:
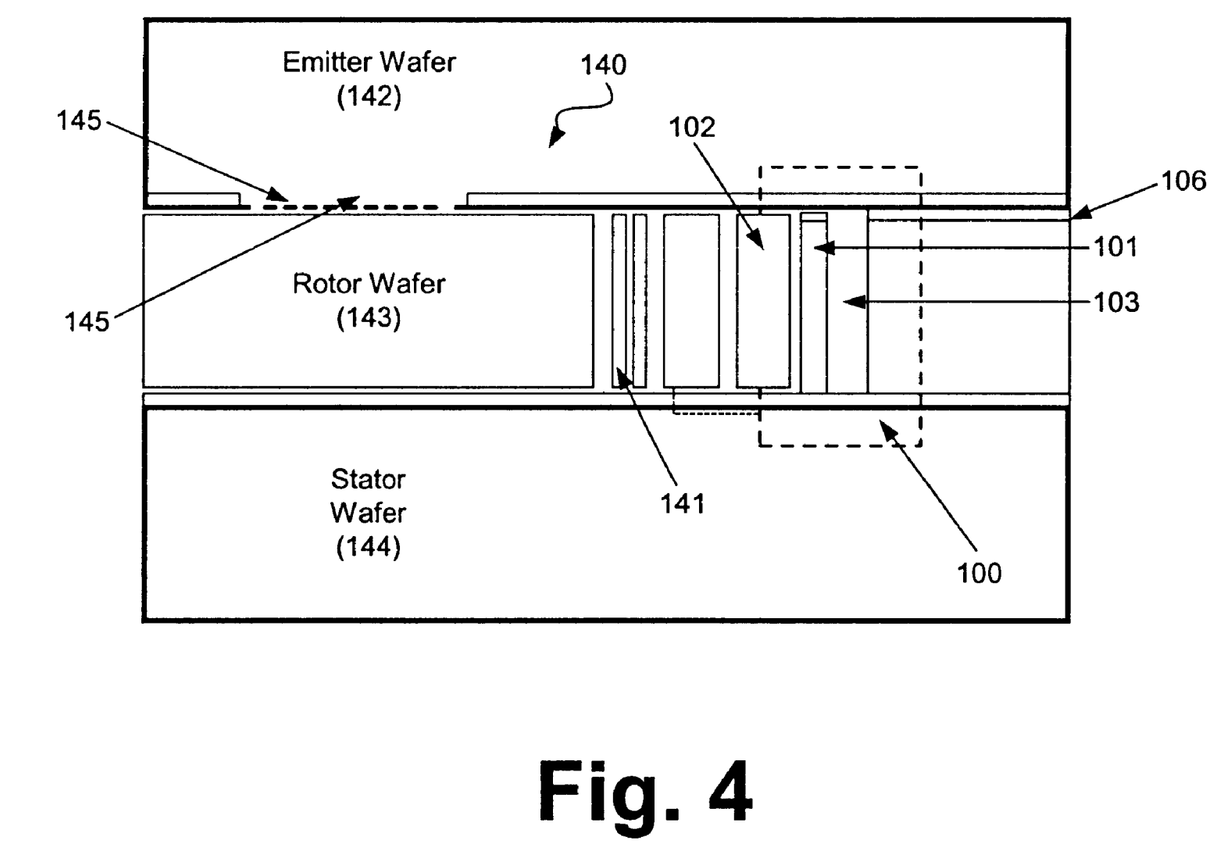
FIG. 4 is an illustration of another embodiment of the present invention in which the pressure sensor of FIG. 1 is integrated with an Atomic Resolution Storage (ARS) device.

FIG. 4 is an illustration of another embodiment of the present invention in which the pressure sensor of FIG. 1 is integrated with an Atomic Resolution Storage (ARS) device. ARS is an emerging technology that aims to provide a thumbnail-sized data storage device with storage densities, for example, greater than one terabit (i.e., 1,000 gigabits) per square inch. The technology builds on advances in atomic probe microscopy, in which a probe tip as small as a single atom scans the surface of a material on which data is stored to produce images accurate to within a few nanometers. Probe storage technology employs an array of atom-sized probe tips to read and write data to spots on the storage medium. A micro-mover positions the storage medium relative to the probe tips.

For optimal operation, an ARS device is generally maintained in a vacuum or, at least, a controlled atmosphere to reduce the possibility of electrons scattering from the read-write beam and to reduce the flow of heat between data spots. Consequently, under principles of the present invention, it is advantageous to integrate an ARS device with a pressure sensor so that the pressure of the vacuum or controlled atmosphere in which the ARS device operates can be monitored on an on-going basis. Such an integrated device is illustrated in FIG. 4.

As shown in FIG. 4, an ARS device and a pressure sensor can be formed in an integrated device. In FIG. 4, the ARS device is on the left of the drawing, while the pressure sensor structure, familiar from previous figures, is on the right of the drawing.

The ARS device includes a silicon flexure (141) that is formed in a silicon substrate known as the rotor wafer (143). The pressure sensor (100) is also formed in the rotor wafer (143), including the thin membrane (101), the second membrane (102) and the reference cavity (103).

The rotor wafer (143) is sandwiched between upper and lower substrates known as the stator wafer (144) and the emitter wafer (142). The ARS device includes an emitter cavity (145) that exposes the rotor wafer (143) to the emitter wafer (142).

FIGS. 5a–8b illustrate the process for manufacturing the integrated pressure sensor and ARS device illustrated in FIG. 4. In FIGS. 5a–8b, the integrated device is shown at various stages of production. The following text will explain these steps and the overall manufacturing process.

Figure 5A:
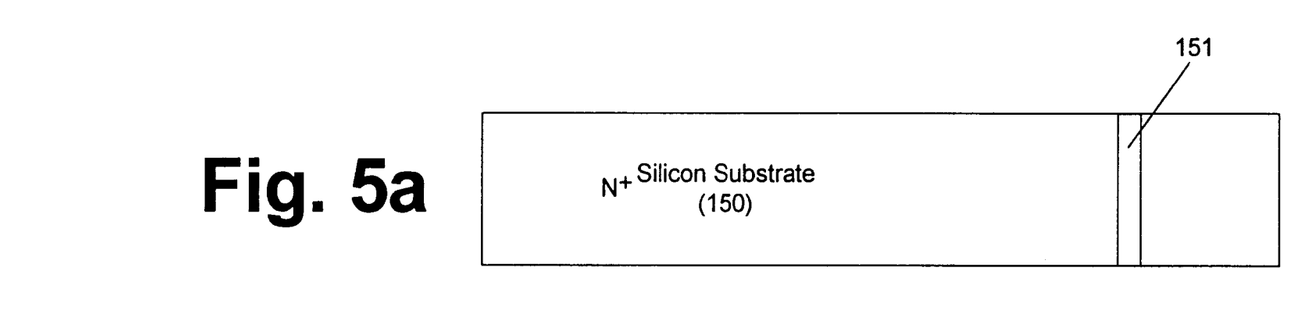

FIG. 5a illustrates the first step in the manufacturing process. As shown in FIG. 5a, the process begins with a silicon substrate (150). This substrate (150) will eventually become the rotor substrate (143) illustrated in FIG. 4. Preferably, the substrate is an N$^+$substrate. FIG. 5a illustrates a cross-section of the substrate (150).

Figures 5B, 5C:
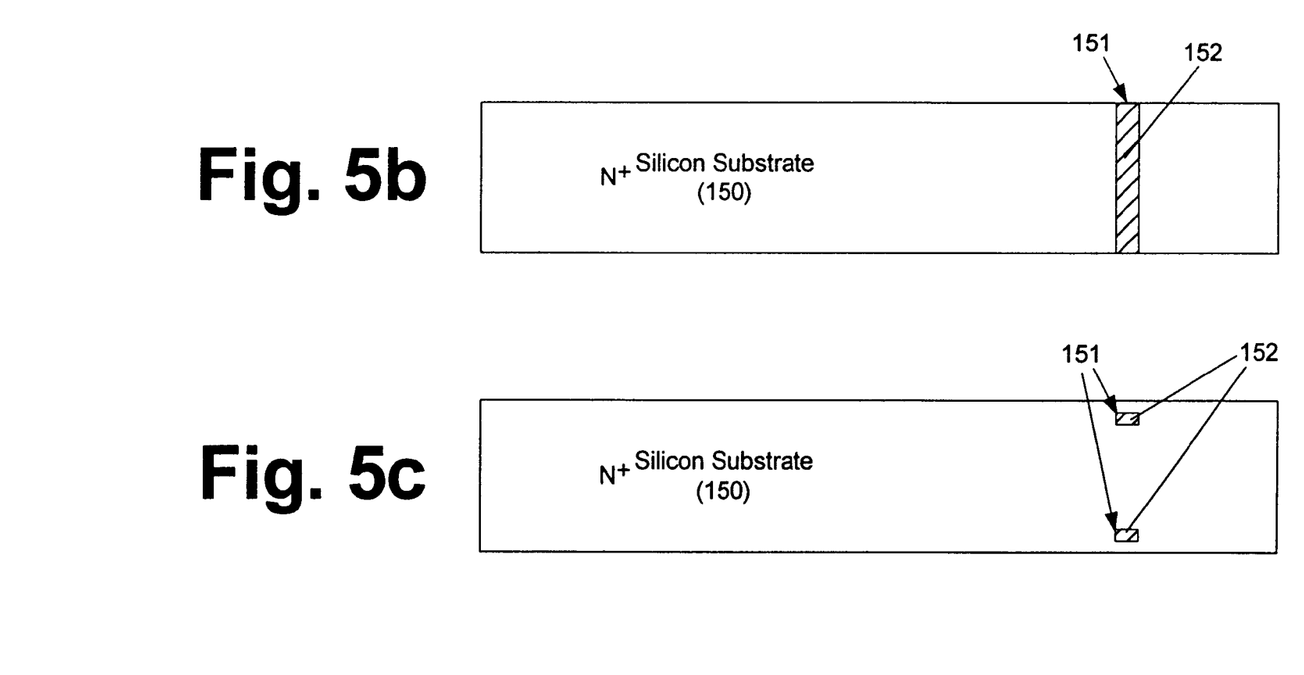

Two holes (151) are etched through the substrate (150). Preferably, Deep Reactive Ion Etching (DRIE) is used to etch the holes (151). A cross-section of one of the holes (151) is illustrated in FIG. 5a. FIG. 5c is a top view of the substrate and can be referenced to locate the preferred relative positioning of the holes (151) illustrated in FIG. 5a. The two holes are near opposite edges of the substrate (150).

FIG. 5b is, again, a cross-section of the substrate (150). As shown in FIG. 5b, the holes (151) etched in FIG. 5a are backfilled with polysilicon (152). FIG. 5c shows a top view of the substrate (150) in which the two holes (151) are filled with polysilicon (152). This polysilicon (152) will be used to form the polysilicon anchors shown in FIG. 1b.

Figure 6A:
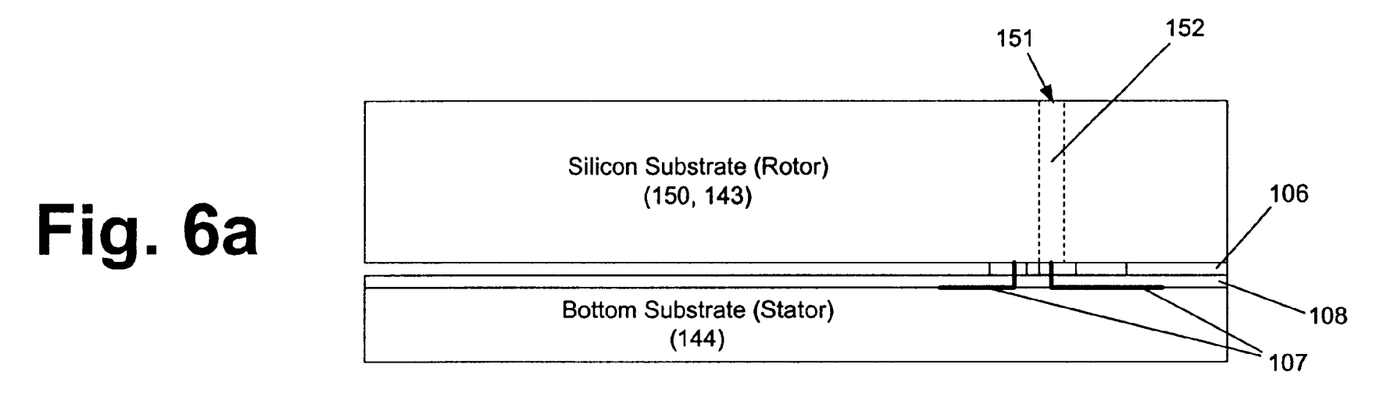

As shown in FIG. 6a, the silicon substrate (150, 143), in which the holes (151) have been etched and filled with polysilicon (152), is bonded to a bottom substrate (144). This bottom substrate (144) will become the stator substrate (144) shown in FIG. 4. Before the bottom substrate (144) is bonded to the rotor substrate (150, 143), the electrical interconnections (107) are patterned on the substrate (144). A dielectric layer (108) may then be deposited over the substrate (144). The connections (107) penetrate the dielectric layer (108) to contact the silicon substrate (150, 143) at points where the thin membrane and the second membrane of the pressure sensor will be formed.

Bonding layer (106) is applied. The rotor substrate (150, 143) and the stator substrate (144) are then bonded together as shown in FIG. 6a.

Figure 6B:
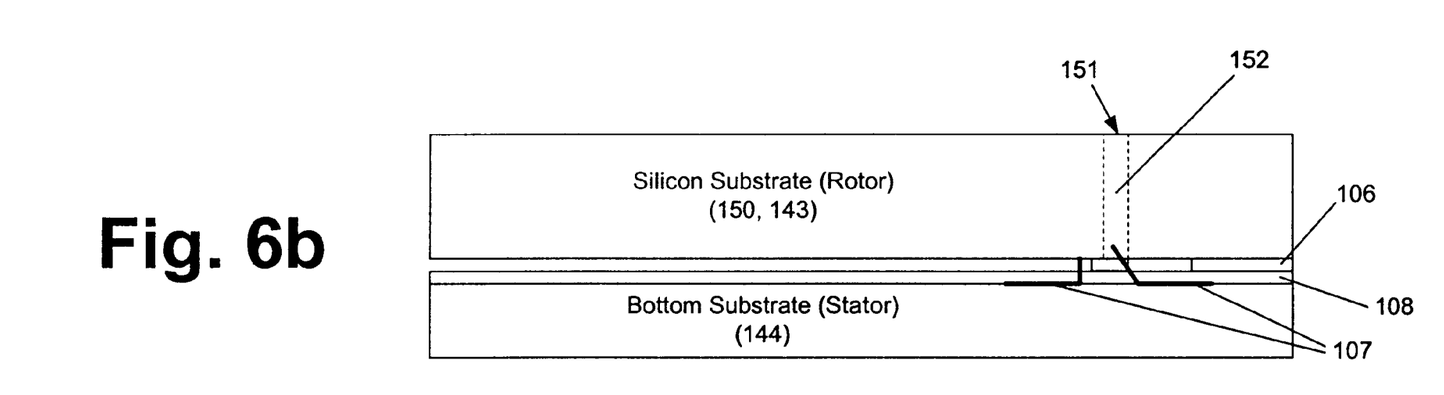

As shown in FIG. 6b, the bonded substrates are then polished and thinned. The rotor substrate (150, 143) is preferably ground to a thickness of approximately 100 μm.

Figure 7A:
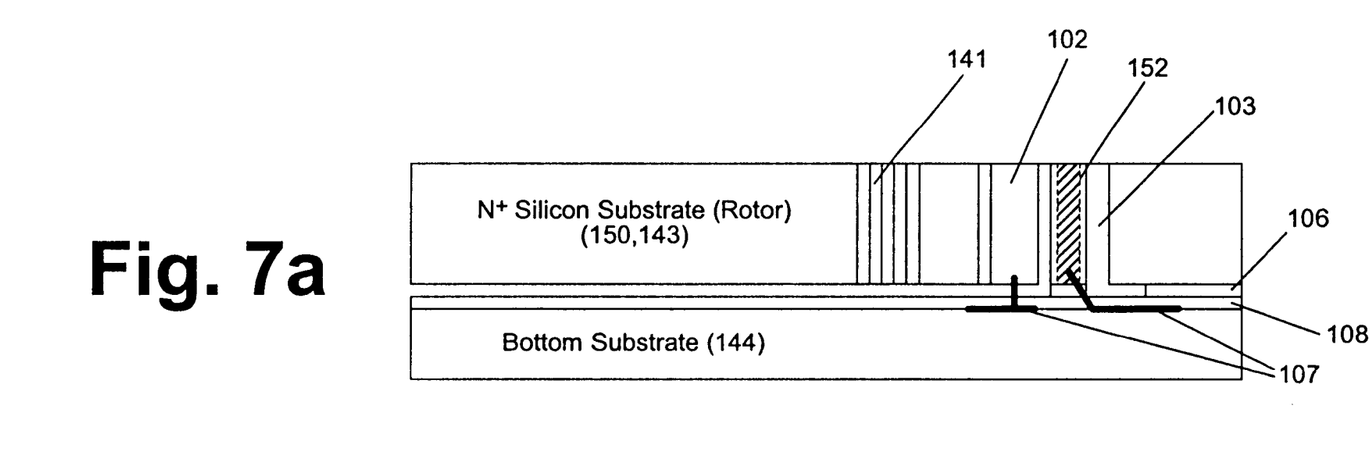

As shown in FIG. 7a, the silicon flexure (141) of the ARS device (170) and the reference cavity (103) of the pressure sensor are next cut into the substrate (150, 143). Again, DRIE is preferably used to cut these structures into the substrate (150,143). FIG. 7a is a cross-sectional view of the device at this stage of production. Further etching is performed to define the thin silicon membrane (101) and the second membrane (102) of the pressure sensor (100).

Figure 7B:
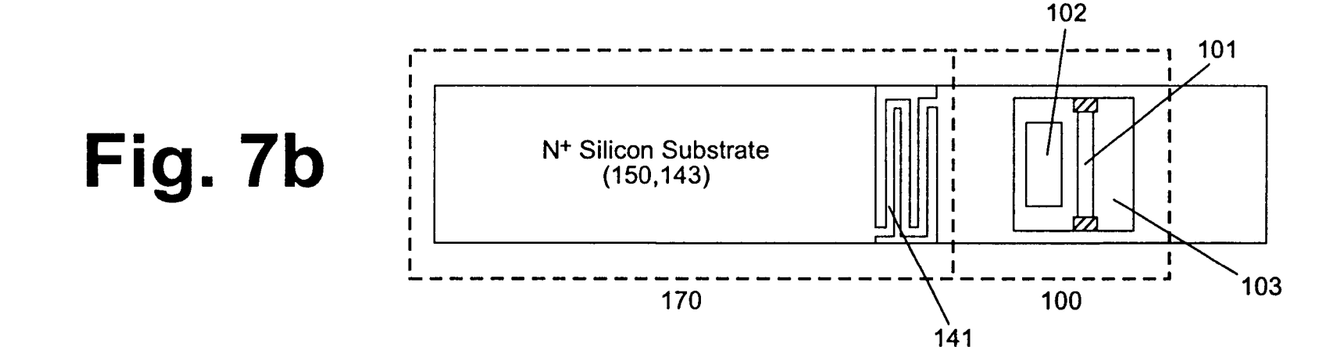

FIG. 7b is a top-down view of the device at this stage of production. From the view in FIG. 7b, it is easier to observe the structure of the pressure sensor (100), including the thin membrane (101), the second membrane (102) and the reference cavity (103). FIG. 7b also give another view of the silicon flexure (141) of the ARS device (170).

Figure 8A:
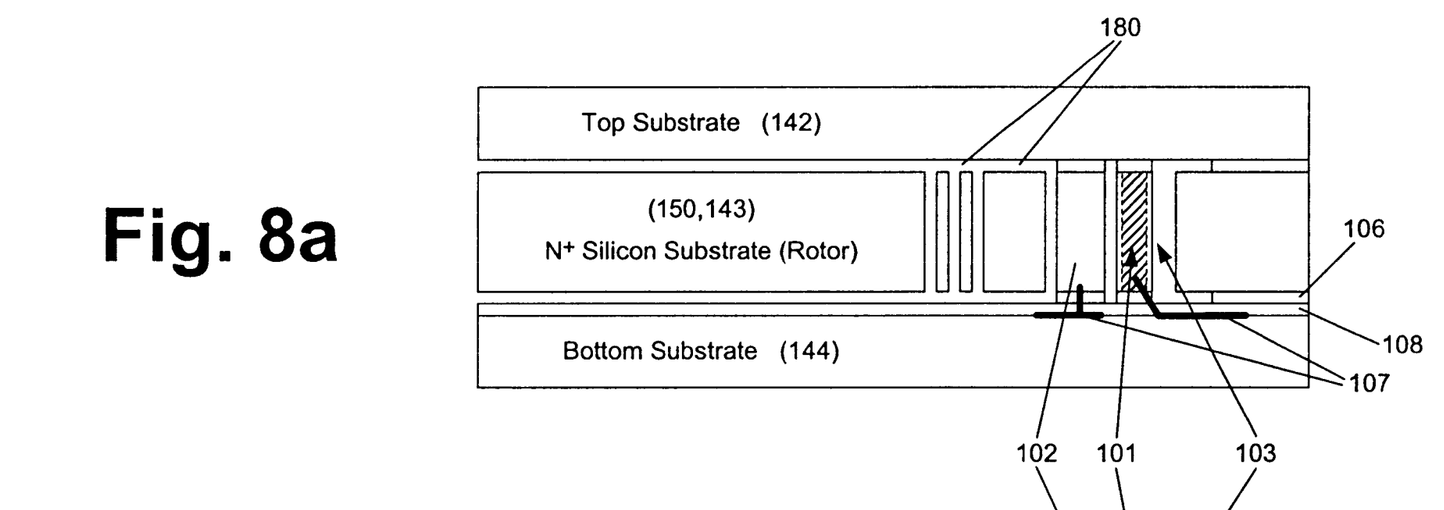

As shown in FIG. 8a, the top or emitter substrate (142) is now bonded to the structure. This bonding process is preferably conducted in a vacuum so as to seal a vacuum in the reference cavity (103) of the pressure sensor(100).

Figure 8B:
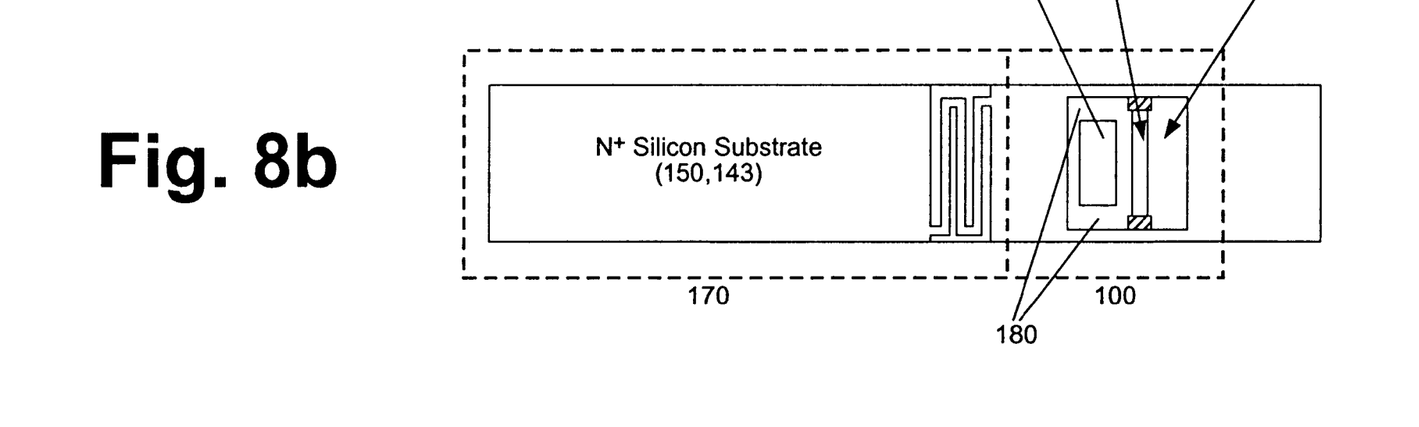

Passageways (180) are defined to provide communication between the ARS (170) and the thin membrane (101) of the pressure sensor (100). These passageways (180) may be between the upper (142) and lower substrate (144) and the rotor substrate (150, 143) and around the sides of the second membrane (102). Consequently, the pressure sensor (100) can monitor the pressure, i.e., the vacuum, that should be maintained in the ARS device (170) for optimal operation of the ARS device (170). FIG. 8b provides a top view of the completed device illustrated in FIG. 8a.

This is just one example of a possible process that can be used to fabricate a vertical pressure sensor according to principles of the present invention. Other processes will be apparent to those skilled the in art with the benefit of this disclosure. Such fabrication processes may or may not include integrating the pressure sensor with an ARS, MEMS or other device. The bottom line is that the vertical pressure sensor of the present invention can be integrated into many different MEMS, ARS or other designs much better than existing pressure sensors due to its small size requirements and the fact that it can be constructed in a silicon substrate from or on which many other types of devices can also be constructed.

Figure 9A:
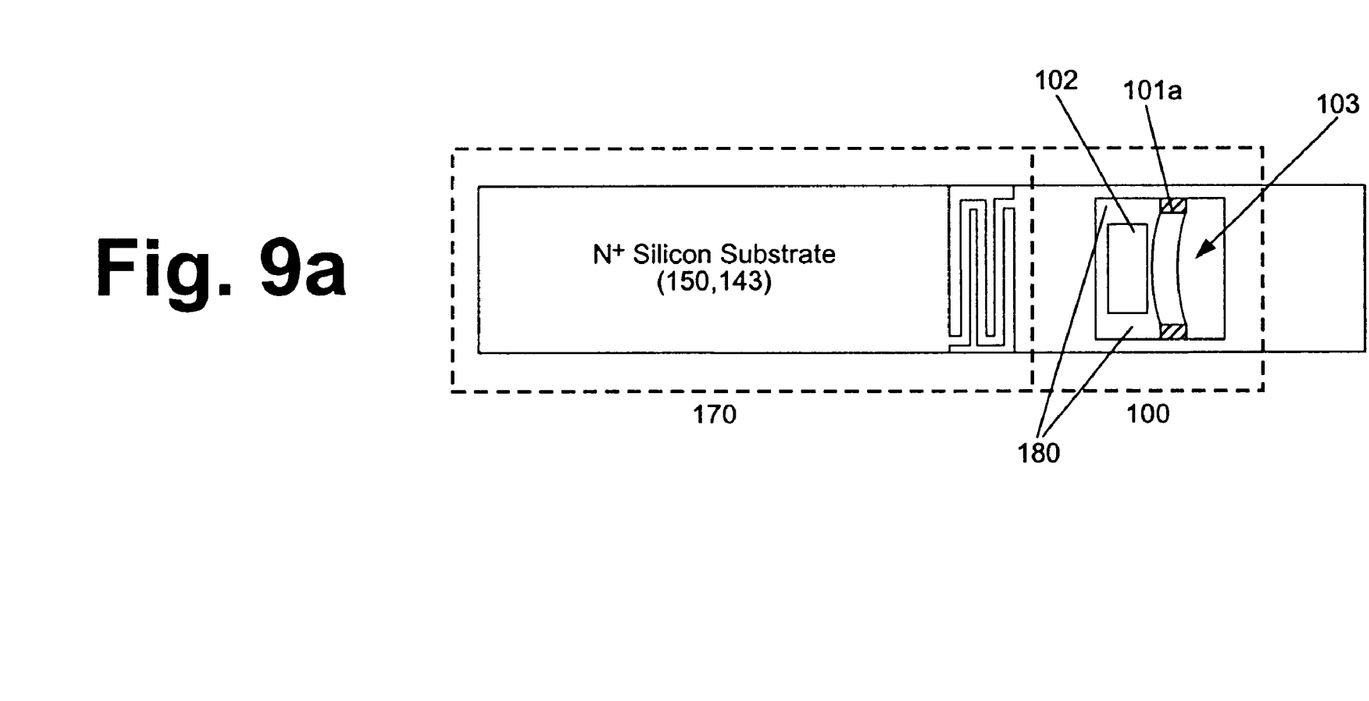
FIGS. 9a & 9b illustrate further embodiments of the present invention in which a membrane of the pressure sensor has a convex or concave shape.
Figure 9B:
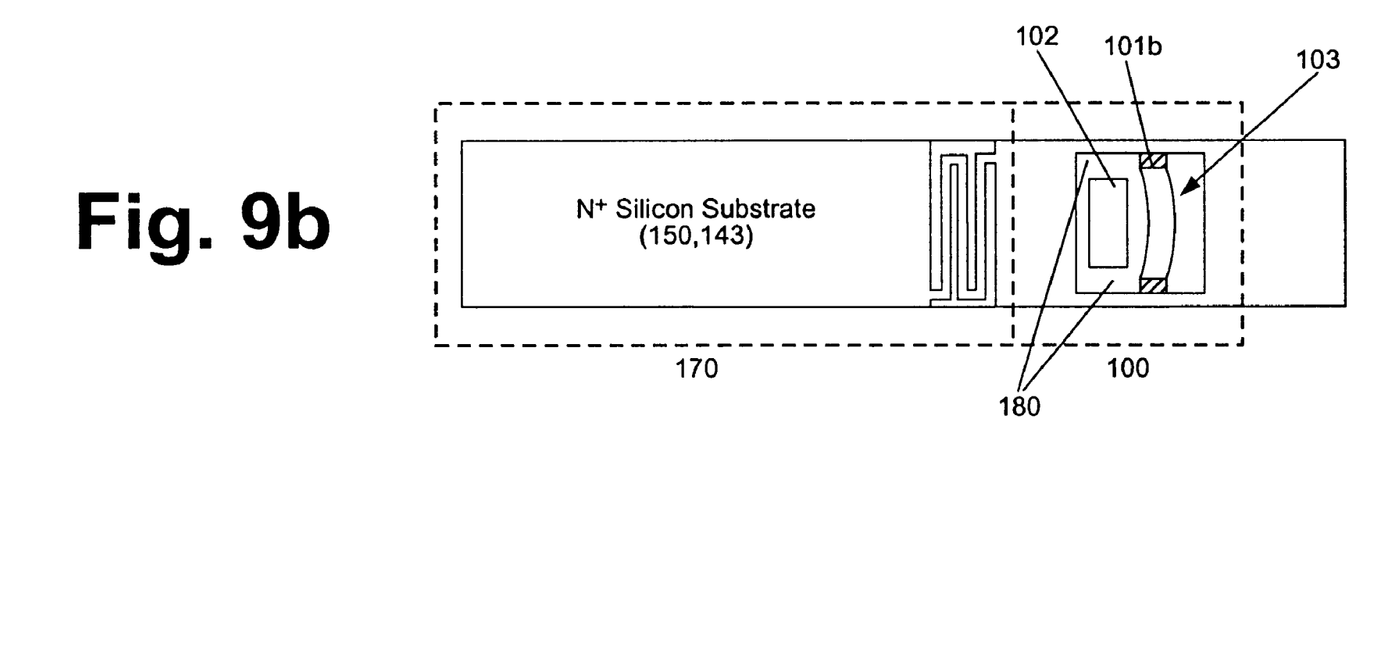

FIGS. 9a and 9b illustrate further possible embodiments of the present invention in which one of the membranes of the pressure sensor is formed with a curvature so as to be concave or convex. In FIG. 9a, the thin membrane (101a) is curved with respect to the second membrane (102) and curves toward the second membrane (102). In FIG. 9b, the thin membrane (101b) is again curved with respect to the second membrane (102), but is curved away from the second membrane (102).

One significant advantage to the present invention is that due to the manner in which the membranes (101, 102) are formed, they can be formed with a curvature so as to be concave or convex with respect to the other membrane. As described above, the membranes (101, 102) may preferably be formed by etching a silicon or other substrate. Consequently, the etching can be conducted so as to impart a curvature to one or the other of the two membranes (101, 102).

When one of the membranes (101, 102) has a convex or concave shape, the pressure sensor (100) may be sensitive to a broader range of pressures. Additionally, when one of the membranes (101, 102) has a convex or concave shape, the pressure sensor (100) may be more sensitive, i.e., register smaller changes in pressure than would otherwise be detectable.

The preceding description has been presented only to illustrate and describe the invention. It is not intended to be exhaustive or to limit the invention to any precise form disclosed. Many modifications and variations are possible in light of the above teaching.

The embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A pressure sensor comprising:
   a first membrane that flexes in response to pressure;
   a reference cavity covered by said first membrane, said reference cavity containing a vacuum; and
   a second membrane adjacent to said first membrane and not within said reference cavity, said first and second membranes forming a capacitor having a capacitance that varies in accordance with the flexing of said first membrane and said pressure;
   wherein said first and second membranes are formed in a silicon substrate; and
   further comprising a polysilicon anchor on both edges of said first membrane securing said first membrane in said silicon substrate.

2. A pressure sensor comprising:
   a first membrane that flexes in response to pressure;
   a reference cavity covered by said first membrane, said reference cavity containing a vacuum; and
   a second membrane adjacent to said first membrane and not within said reference cavity, said first and second membranes forming a capacitor having a capacitance that varies in accordance with the flexing of said first membrane and said pressure;
   wherein said first membrane has a curvature that curves toward said second membrane.

3. A pressure sensor comprising:
   a first membrane that flexes in response to pressure;
   a reference cavity covered by said first membrane, said reference cavity containing a vacuum; and
   a second membrane adjacent to said first membrane and not within said reference cavity, said first and second membranes forming a capacitor having a capacitance that varies in accordance with the flexing of said first membrane and said pressure;
   wherein said first membrane has a curvature that curves away from said second membrane.

4. A pressure senior comprising:
   a first membrane that flexes in response to pressure;
   a reference cavity covered by said first membrane, said reference cavity containing a vacuum;
   a second membrane adjacent to said first membrane and not within said reference cavity, said first and second membranes forming a capacitor having a capacitance that varies in accordance with the flexing of said first membrane and said pressure;
   an upper substrate; and
   a lower substrate;
   wherein said first and second membranes are supported between and bonded to said upper and lower substrates; and
   wherein opposite edges of each of said first and second membranes are bonded respectively to said upper and lower substrates.

* * * * *